United States Patent [19]

Pike

[11] Patent Number: 4,601,945
[45] Date of Patent: Jul. 22, 1986

[54] POLYIMIDE MATRIX, FIBER REINFORCED COMPOSITE ARTICLE AND METHOD OF MAKING THE SAME

[75] Inventor: Roscoe A. Pike, Windsor, Conn.

[73] Assignee: United Technologies Corporation, Hartford, Conn.

[21] Appl. No.: 695,784

[22] Filed: Jan. 28, 1985

[51] Int. Cl.[4] ..................... B32B 27/34; B32B 27/36; B32B 9/00; B32B 31/00
[52] U.S. Cl. .................... 428/287; 156/264; 156/307.5; 427/289; 427/370; 428/408; 428/473.5
[58] Field of Search .................. 428/473.5, 375, 379, 428/287, 408; 427/289, 370, 401; 156/264, 307.5

[56] References Cited

U.S. PATENT DOCUMENTS

| | | | |
|---|---|---|---|
| 4,049,613 | 9/1977 | White | 260/37 N |
| 4,073,788 | 2/1978 | Peterson | 260/29.2 N |
| 4,146,668 | 3/1979 | Dorey et al. | 428/283 |
| 4,290,929 | 9/1981 | McGregor et al. | 260/29.2 N |
| 4,471,022 | 9/1984 | McGregor et al. | 428/375 X |

*Primary Examiner*—Michael R. Lusignan
*Attorney, Agent, or Firm*—Alan C. Cohen

[57] ABSTRACT

A method of making a fiber reinforced polyimide matrix composite article is described. The method comprises preparing an aqueous solution of a polyimide matrix material containing sufficient nonionic surfactant such that the surface tension of the solution is about 35 dynes per centimeter or lower. The solution is then coated onto the fibers and the coated fibers formed into tapes. The tapes are then dried, cut into predetermined shapes and laid one on top of the other to form a lay-up. The lay-up is then densified under heat and pressure forming a polyimide matrix composite article.

5 Claims, No Drawings

POLYIMIDE MATRIX, FIBER REINFORCED COMPOSITE ARTICLE AND METHOD OF MAKING THE SAME

DESCRIPTION

1. Technical Field

The technical field to which this invention pertains is fiber reinforced composite articles.

2. Background Art

Fiber reinforced composite articles have, in the past, been formed by applying an polyimide organic polymer matrix to the fiber reinforcement and then forming the coated fibers into the desired shape, then densifying and curing the matrix under heat and pressure to form the composite article. Historically, the matrix materials used in these composites have been dissolved in an organic solvent, i.e. NMP, DMF, etc., for ease of application of the matrix onto the fibers.

It has been known for some time that any residual organic solvent which remains behind, entrapped in the composite article after densification and curing, causes the composite article to be unstable. The instability is caused by the expansion and contraction of the entrapped solvent during thermal cycling which results in reduced physical properties due to increased void content.

The use of organic solvents in all industrial processes, presents a strong environmental concern, as well as, a health hazard for those working with such materials. Additionally, the direct cost of these materials has been constantly rising not to mention the secondary costs associated with their use, i.e. peripheral equipment required by numerous federal regulations which must be employed when these solvents are used, waste disposal after use, which are not inconsiderable.

Therefore, what is needed in this art is a method to make fiber reinforced, organic polymer matrix composite articles, which does not require the use of organic solvents and thereby results in a more stable composite article than those formed using organic solvents.

DISCLOSURE OF INVENTION

The present invention discloses a method of making a fiber reinforced, polyimide matrix composite article. The method comprises preparing an aqueous solution of a polyimide prepolymer matrix material wherein said aqueous solution contains sufficient surfactant to cause the surface tension of the solution to be about 35 dynes/cm or lower. The matrix solution is then placed onto the fiber reinforcement and the coated fibers are formed into a tape. The water is substantially removed from the tape and the dried tape is then cut into predetermined shapes, which are placed with specific predetermined fiber orientation, in a mold to form a lay-up which is then densified under sufficient heat and pressure to form the cured composite article.

Also disclosed is the resulting fiber reinforced composite article formed using the present method.

Other features and advantages of the present invention will become more apparent from the following detailed description of the preferred embodiment.

BEST MODE FOR CARRYING OUT THE INVENTION

The polyimide matrix materials which can be used to practice this invention are any water soluble polyamic acids. It is desirable that such polyamic acids possess physical characteristics which will, upon curing, produce a fiber reinforced composite article having good thermal stability at high temperatures (above 275° C.) as well as good moisture and solvent resistance. Additionally, the polyimide matrix should be easily processable. One such polyimide material is formed from the reaction of butane tetra-carboxylic acid and methylene dianiline as described in commonly assigned U.S. Pat. No. 4,471,022 and is incorporated herein by reference.

The reinforcing fibers which can be used to form the composite article again may be any of the conventional reinforcing fibers such as glass fibers, graphite, aromatic polyamide, etc., with graphite fibers being preferred. The fibers may be in the form of unidirectional fibers, fiber tows, a woven or knitted material or any of the other conventional configurations.

In addition to the two principle components of the composite articles, the present method requires the use of a surfactant or wetting agent which is capable of lowering the surface tension of the aqueous solution of the polyamic acids to about 35 dynes/cm or below. These aqueous soluble surfactants are typically of the nonionic species, i.e. contain no chloride or alkali metal salts. Two such surfactants are Union Carbide's NP-27 which is a polyoxyethylene derivative of nonyl phenol and DuPont's Zonyl FSN which is a fluorocarbon based compound. Additional surfactants are Surfynols and Alrosol O. The former is available from Air Products and Chemicals Corporation and is an acetylenic substituted diol, while the latter is an amide of a fatty acid and is available from the Ciba Geigy Corporation. Those skilled in the art would be aware of other nonionic surfactants and the present disclosure is not limited to these four.

The method disclosed herein comprises the following:

An aqueous solution of the polyimide matrix material is prepared by dissolving the polyimide in a container of water. Typically the water will be at ambient temperature (about 70°–85° F., 21.1°–29.4° C.) however, warm water is preferred (about 90°–120° F., 32.2°–48.9° C.). This solution contains from about 30 percent to about 70 percent polyimide resin with about 35 to about 40 percent being preferred. Such a concentration will produce a solution having a workable viscosity of about 500 cps. to about 3,000 cps. However, the viscosity will vary with the kind of resin used and may be higher. The solution is mixed thoroughly and the surfactant is then added. Typically, the surfactant will be added in sufficient quantities to lower the surface tension of the polymer resin solution to about 35 dynes/cm or below. These quantities are not critical, and range from about 0.01 percent to about 0.1 percent of the weight of the resin present in the solution. The quantities will vary depending on the efficiency of the particular surfactant in a particular resin system. It is believed that the criticality of the surface tension is directly related to the wetting of the polymer to the fiber reinforcement resulting in fewer voids, greater contact between constituents and thereby an improved composite article. Therefore, it is felt that it is not so much the absolute quantity of the surfactants present which is important, but its effect on the wetting of the polymer to the fibers which is critical. It has been found that a surface tension of from about 35 dynes/cm or below results in satisfactory wetting and an improved composite.

Once the surfactant has been added to the solution and the solution has been made substantially homogenous by mixing or stirring, it is applied to the fiber reinforcement. The methods of application are all conventional and will vary depending on the particular form in which the reinforcement is being used. For instance, when the fiber reinforcement comprises continuous filaments and will be used on a filament winding apparatus, it is common practice to draw the filament through a trough of the matrix solution, thus coating the filament which is then wound onto a mandrel using conventional equipment. The wound article is then heated to substantially remove the water, without curing the resin. Once the water has been removed, the composite article is cured in a conventional manner. When unidirectional tapes of fiber and matrix prepegs are to be prepared, the fiber is again drawn through a trough of the matrix solution, coating the fibers which are then rolled onto a drum and dried. The resulting tapes are then cut into predetermined shapes, placed into a conventional mold and through the application of sufficient heat and pressure is densified and the matrix cured to form the composite article. Yet a third approach is to form a dry lay-up (the fiber reinforcement alone) of fiber reinforcement material which has been knitted or woven into a mat, in a mold, then coating the dry lay-up with the matrix solution which is then dried and again densified and heated to cure the matrix forming the composite article.

No matter how the polymer is applied to the reinforcing plies, the water solvent should be substantially removed by either heat, vacuum or other compatible means. Typically this is done by exposing the coated fibers to temperatures above 212° F. (100° C.) but below the polymerization temperature of the polyimide. Once the water has been removed, the prepreg (which is then formed) may be processed in a conventional manner as described above.

EXAMPLE

A mixture of 12.37 grams of NMP, 3.03 grams of water, 20.61 grams of BTC, and 2.73 grams of Curithane 103 are heated at 185° F. (85° C.) until fully reacted as indicated by a clearing of the solution. 8.72 grams of MDA is then dissolved in the solution. This mixture is then heated to approximately 221° F. (105° C.) and a pack column utilized to keep all of the solvent and reaction water in solution. The heating is continued until all of the materials react as evidenced by clearing of the solution. 5.14 grams of a 70% solution of HMDA in water is then added to the reaction mixture and heated to 311° F. (155° C.) over a 6-8 hour period. The condensed water and the original solvent is allowed to come off during the course of this reaction, the bulk coming off at around 230° F. (110° C.) to 275° F. (135° C.). Heating continues until approximately 85% of the theoretical water of condensation and all the solvent water comes off. The material is cooled below 284° F. (140° C.) and solubilization with an ammonia-water solution begins. A pack column is also used at this point to keep the ammonia in the solution. Initially, 4.85 grams of a 28% by weight ammonia solution is added along with 14.47 grams of water. This composition is mixed and cooled until the temperature drops to 194° F. (90° C.) and is held therefor one-half to one hour. The mixture is then cooled to 158° F. (70° C.) and an additional 1.15 grams of 28% ammonia and 26.93 grams of water is added to the solution to attain the desired 35-38% by weight solids content, 2000-3000 cps viscosity at 86° F. (30° C.), and a pH of 7-7.2. In this case, an additional 0.32 gram of a 28% ammonia solution and 3.18 grams of water are required to attain this range of properties.

An aqueous solution of 35% by weight of the above polyimide prepolymer was prepared. The prepolymer was stirred at ambient temperature (about 75° F., 23.9° C.) until dissolved. To this solution was then added, by stirring, 0.05% by weight of the surfactant FSN available from DuPont Corporation. The addition of the surfactant lowered the surface tension from 63 dynes/cm. to 23 dynes/cm. Then a continuous tow of Celion 6000 graphite fiber, available from Celenese Corporaiton, was drawn through the aqueous solutiion, thereby coating the fibers with the polymer. The coated fiber was wound onto a 37 inch diameter drum to form a tape. The tape was allowed to air dry, thereby removing the solvent. It was then removed from the drum, and dried in a vacuum oven at 212° F. (100° C.) under a vacuum of 0.5 psi. The tape was then B-staged in an air atmosphere at 302° F. (150° C.) for 0.5 hours. The tape was then removed from the oven and cut into strips 1.5 inches wide by 5 inches long. An 8-ply laminate of the above strips was laid up in a steel mold. The mold was then placed into a preheated press at 500° F. (260° C.) and pressed for 0.5 hours at 200 psi. The temperature was then increased to 572° F. (300° C.) gradually over one hour at the rate of about 5° C./min. The pressure was released for 0.1 minute intervals as the temperature reached each stage at 482° F. (250° C.) and 527° F. (275° C.), to allow for the reaction water to escape. When the temperature reached 536° F. (280° C.) the pressure was increased to 400 psi. The pressure was maintained until the temperature reached 572° F. (300° C.) and was maintained for one hour. The mold was then allowed to cool to ambient (80° F., 26.6° C.) under pressure. The resulting pressure was then relieved and the resulting composite removed. The composite had a fiber content of 45.3 volume percent and a resin content of 54.6 volume percent with a void content of 0.7 volume percent.

The particular method disclosed herein represents a further step in the direction to reducing the use of organic solvents in industrial processes. This has been a continuing struggle since these solvents represent a potential health hazard to those exposed to them as well as an environmental hazard. Additionally, since the availability of these organic solvents and consequently their cost is linked to the availability and cost of oil, the elimination of this discrepancy and the replacement of them by water will result in a more stable, predictable and less expensive product.

A further advantage to the present invention is that the resulting products have increased stability due to the elimination of residual organic solvent material entrapped within the composite article. Additionally, the void content of the composite article manufactured with this method will have significantly lower void contents than the composites produced using prior art methods. Typically these will be about 2% or less.

It should be understood that the invention is not limited to the particular embodiments shown and described herein, but that various changes and modifications may be made without departing from the spirit and scope of this novel concept as defined by the following claims.

I claim:

1. A method of making a fiber reinforced, polyimide matrix composite article comprising:

preparing an aqueous solution of a water soluble polyimide precursor matrix material, said solution containing sufficient nonionic surfactant to lower the surface tension of the solution to about 35 dynes/cm or lower, coating the reinforcing fibers with the matrix solution, forming the coated fibers into tapes, removing the excess water from the matrix material, forming a dried tape, cutting the tapes into predetermined shapes, stacking these cut shapes to form a preform lay-up, densifying under sufficient heat and pressure to form the cured polyimide matrix composite article.

2. A composite article of fiber reinforced, polyimide resin matrix resulting from the method of claim 1.

3. The method of claim 1 wherein the fibers are graphite.

4. The method of claim 1 wherein the surfactant is a nonionic surfactant.

5. The method of claim 1 wherein the matrix material is a polyimide based on butane tetracarboxylic acid and methylene dianaline.

* * * * *